No. 636,146. Patented Oct. 31, 1899.
W. HUME.
ANIMAL SHEARS.
(Application filed Oct. 5, 1898.)
(No Model.)
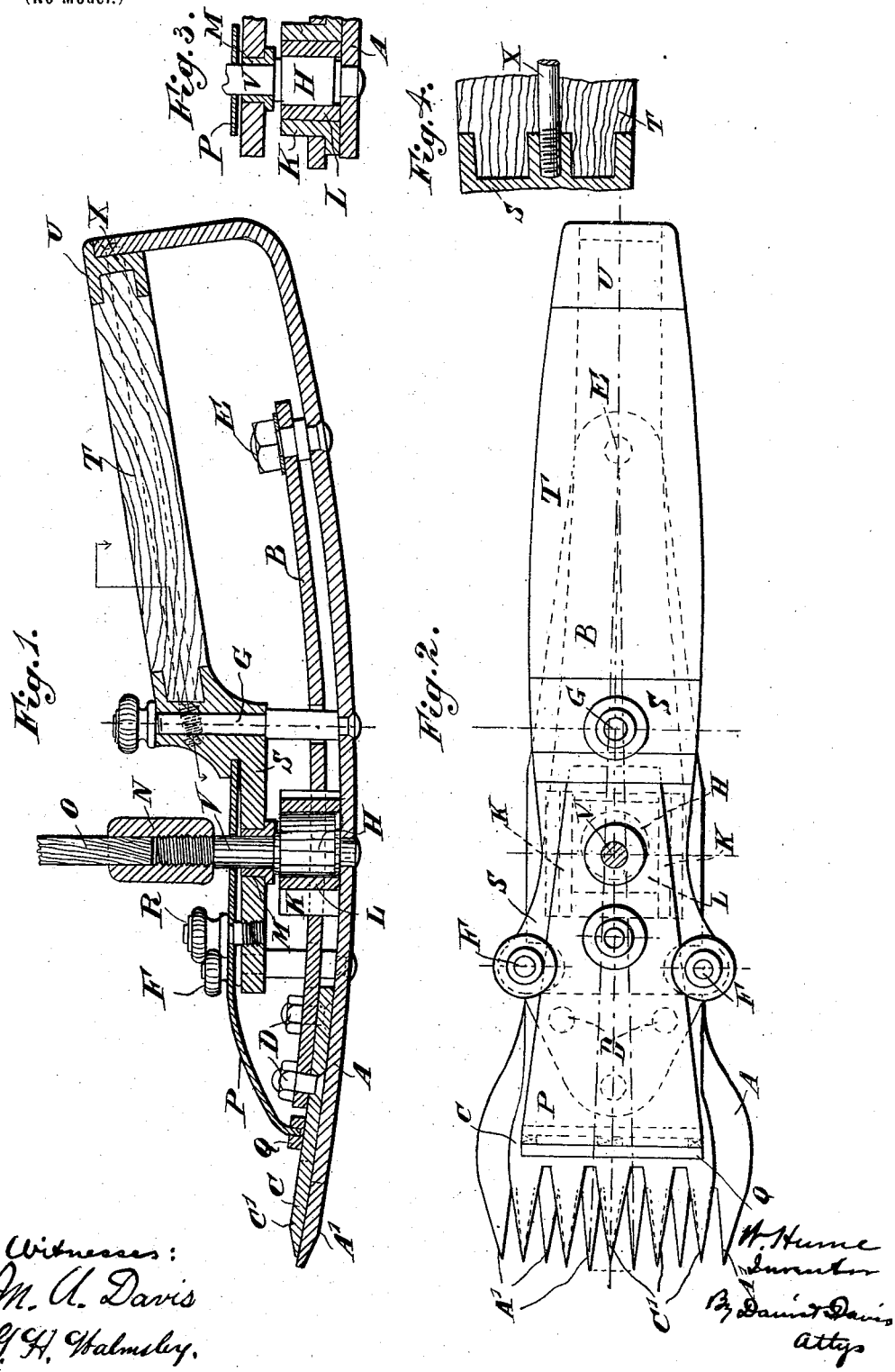

UNITED STATES PATENT OFFICE.

WASHINGTON HUME, OF LONDON, ENGLAND.

ANIMAL-SHEARS.

SPECIFICATION forming part of Letters Patent No. 636,146, dated October 31, 1899.

Application filed October 5, 1898. Serial No. 692,724. (No model.)

*To all whom it may concern:*

Be it known that I, WASHINGTON HUME, a subject of the Queen of Great Britain and Ireland, residing at New Broad street, London, in the county of Middlesex, England, have invented Improvements in Animal-Shears, of which the following is a specification.

This invention has reference to a simple construction of shearing-machine suitable for shearing sheep and which comprises a frame, a toothed cutter fixed to the frame, another toothed cutter fixed to a pivoted arm, means for imparting radial movement to such arm in a direct manner, so as to cause its cutter-teeth to reciprocate opposite those of the fixed cutter, and an adjustable spring device for pressing the reciprocating cutter against the fixed cutter more or less forcibly according to requirement, as hereinafter described.

Referring to the accompanying illustrative drawings, Figure 1 is a central longitudinal section of a sheep-shearing machine according to this invention. Fig. 2 is a plan, and Fig. 3 is a partial cross-section hereinafter referred to. Fig. 4 is a sectional detail view showing a modification.

A is a blade curved to a suitable radius and fixed, as hereinafter described, to the frame or holder S. At the outer end of the blade A there are teeth A', forming the fixed cutter, which is the lower cutter.

C is the radially-movable or upper cutter. The teeth C' at its outer edge are in the example twice as far apart at their outer ends as are the teeth A' of the lower blade. The upper cutter is fastened by bolts D to an arm B, which is pivoted on a stud-bolt E, that is riveted at its lower end to the fixed blade A. The upper cutter and radial arm are both curved to suitable radii.

By curving the fixed and movable blades and radial operating-arm to a suitable radius, as shown, the shears, while available for cutting wool from convex portions of a sheep's body, can be advantageously used for cutting wool from concave portions of the sheep, such as from its neck and behind its ears, without danger of cutting the animal, as is the case with flat cutting-blades, and such curved blades also enable the wool to be cut closer and faster at the concave parts mentioned than is possible with flat cutting-blades. The use of a curved fixed blade also admits of its forming part of the frame and so increases the strength and lightness of the machine.

In the arm B there is an oblong slot whose sides are furnished with slide-guides K, soldered or otherwise fastened to the blade, so as to form guiding-faces for the sliding block hereinafter mentioned.

H is a cam of sufficient throw to give the requisite radial motion for reciprocating the upper cutter C. The cam H is fast on a spindle V and fits with an easy-working fit a cylindrical hole in a sliding block L, which is adapted to reciprocate between the slide-guides K.

M is a bush of suitable material, such as steel, fastened into the frame S (which may be of brass) to take the wear of the spindle V.

O is a flexible wire or other driving-shaft brazed or otherwise fastened to a screwed coupling N, whereby it can be fastened to the spindle V.

F, F, and G are three studs riveted into the bottom blade A and passing through the frame S, to which they are secured by mill-headed nuts.

P is a flat steel spring having one end inserted into a recess in the frame S and its other end engaged with a friction-block Q, which is in the example formed with three holes into which are inserted three claws formed on the corresponding end of the spring. This spring is for the purpose of pressing the movable cutter C against the fixed cutter A', the pressure being regulated by the stud and milled nut R.

T is a handle (which may be of wood) sunk at each end into sockets in the frames S and U.

X is one of two bolts extending through the back end of the fixed blade A and through the handle T and screwing into the frame S; but there might be only one bolt, and in other respects the details illustrated may be varied. When using one bolt, it may screw into a snug or socket formed in the frame S, Fig. 4.

The operation of the apparatus is as follows: The flexible driving-shaft O, which is attached by a screw-coupling N to the spindle V, is rotated by any suitable motor. The cam H, which is fixed to the spindle V and rotates freely in the sliding block L, is thereby caused to rotate and cause the said sliding block to reciprocate between the slide-guides K and at the same time cause the upper cutter C to oscillate over the lower cutter A.

What I claim is—

1. A shearing-machine comprising a fixed cutter provided with teeth, a radially-movable cutter provided with teeth, an arm carrying said cutter and mounted to oscillate about a pivot on the fixed cutter in rear of the oscillating means, means for oscillating the said movable cutter, and means for pressing said cutters together, said fixed and movable cutters and operating-arm being curved to a suitable radius, substantially as hereinbefore described for the purpose specified.

2. A shearing-machine comprising a frame or holder, a lower cutter fixed thereto, a radially-movable arm pivoted at its rear end to said fixed cutter and formed with a longitudinally-arranged slot extending therethrough between its rear and front ends, a movable cutter carried by the forward end of said radially-movable arm and arranged to oscillate over the fixed cutter, a rotary cam extending through the slot in said movable arm and adapted to oscillate said arm and the cutter attached thereto, said cam having its axis at right angles to said movable arm, means for rotating said cam, and an adjustable spring with friction-block adapted to press the movable cutter against the fixed one, substantially as described.

3. A shearing-machine comprising a frame and fixed cutter-blade having teeth at its front end, an arm pivoted at its rear end to said fixed cutter-blade, a movable cutter fixed to the front end of said arm and arranged to oscillate over said fixed cutter, a sliding block arranged to reciprocate in a slot in said arm, a rotary cam fitted in said block, means for rotating said cam, and means for keeping said cutter-blades in close contact with each other, substantially as described.

4. The improved shearing-machine comprising the frame S, the curved blade A fixed thereto and provided at its front end with teeth A', the handle T connecting the upwardly-bent rear end of said blade to said frame, the radially-movable cutter C with teeth C' and curved carrying-arm B fixed to the movable cutter, formed with a longitudinal guideway, and pivoted at its rear end to said fixed blade, the rectangular slide-block L mounted to work in said guideway, the cam H fitted in said block and secured to a spindle extending through said frame and adapted to be rotated by a flexible shaft, and the adjustable spring-plate P with friction-block Q for pressing said fixed and movable blades together, all substantially as described and shown.

Signed at the city of London, England, this 16th day of September, 1898.

WASHINGTON HUME.

Witnesses:
H. W. ALLISON,
F. CHIPPERFIELD.